United States Patent [19]

Christensen et al.

[11] 4,407,873
[45] Oct. 4, 1983

[54] RETORTABLE PACKAGING STRUCTURE

[75] Inventors: Ronald C. Christensen, Oshkosh; Roger P. Genske; Dennis E. Kester, both of Neenah; William F. Ossian, Appleton, all of Wis.

[73] Assignee: American Can Company, Greenwich, Conn.

[21] Appl. No.: 405,717

[22] Filed: Aug. 6, 1982

[51] Int. Cl.³ .................. B65D 85/72; B65D 65/40; B65D 81/18; B32B 27/08
[52] U.S. Cl. .................................. 428/35; 206/484; 206/484.2; 206/524.2; 426/113; 426/127; 428/475.5; 428/475.8; 428/476.1; 428/516
[58] Field of Search ............ 428/35, 475.5, 475.8, 428/476.1, 516, 523; 206/484, 484.2, 548.2; 426/113, 127

[56] References Cited

U.S. PATENT DOCUMENTS

| | | | |
|---|---|---|---|
| 4,275,119 | 6/1981 | Weiner | 428/35 |
| 4,276,330 | 6/1981 | Stanley et al. | 428/35 |
| 4,303,710 | 12/1981 | Bullard et al. | 428/35 |
| 4,308,084 | 12/1981 | Ohtusuki et al. | 428/35 |
| 4,355,721 | 10/1982 | Knott et al. | 428/35 |
| 4,356,221 | 10/1982 | Anthony et al. | 428/35 |
| 4,357,376 | 11/1982 | Nattinger et al. | 428/35 |
| 4,360,551 | 11/1982 | Guarino et al. | 428/35 |
| 4,364,981 | 12/1982 | Horner et al. | 428/35 |

*Primary Examiner*—William J. Van Balen
*Attorney, Agent, or Firm*—Stuart S. Bowie; Thomas D. Wilhelm

[57] ABSTRACT

Retortable packaging is made entirely with polymeric materials. The improved heat sealable structure has an inner heat seal layer of linear low density polyethylene. The second or adjacent layer is linear low density polyethylene with an optional 0% to 80% medium density polyethylene blended into it. A third layer is anhydride modified medium density polyethylene. Fourth, fifth and sixth layers respectively are nylon, ethylene vinyl alcohol and nylon. An optional layer between the second and third layers is at least 20% linear low density polyethylene and up to 80% medium density polyethylene. The entire multiple layer structure is firmly adhered together so that the layers mutually support each other in the unitary package.

6 Claims, 4 Drawing Figures

RETORTABLE PACKAGING STRUCTURE

BACKGROUND OF THE INVENTION

Heat sealed pouches made from flexible sheet stock are now being used for packaging certain products which are stored under sterile conditions. Typical products packaged and used in this manner are certain foods and medical supplies. The packaging thus used is known generally as a retort pouch.

The first generation of retort pouches included certain adhesives, used for laminating the various layers. The adhesives had some residual monomer moieties after the adhesive was fully cured. These structures were rejected by governmental authorities because of the perceived possibility of migration of toxic monomers into packaged food product.

In more recent developments, retort pouch structures are made by various methods of adhering the layers to each other by one or more of several extrusion processes. Illustrative of these processes is one taught in U.S. Pat. No. 4,190,477. In the process described in that patent, biaxially oriented polyester is first adhesively mounted to metal foil on what is to be the outside of the package. This use of adhesive is considered acceptable because the foil serves an an effective barrier to migration of residual monomer, from the adhesive, to the inside of the package. A polypropylene-based heat sealing layer is separately extruded. A primer is applied to the side of the foil opposite the polyester. Finally the sealant layer and the primed foil are extrusion laminated together using an extrusion grade polypropylene-based polymer as the extrusion laminant.

Common to the requirements of retort pouch packaging is the requirement that the filled and sealed package be subjected to sterilizing conditions of relatively high temperature after the pouch is filled with product and sealed. Typical sterilizing conditions range in severity up to about 275° F. with residence times at that temperature of as much as 30 minutes or more. Such conditions impose severe stresses on the packages. Many packaging structures provide excellent protection for the package contents at less severe conditions. For example, relatively simple packaging structures for packaging requiring the ability to withstand boiling water, such as at 212° F. are readily available from several suppliers. When sterilizing conditions are required, however, most of these packages fail to survive the processing. Typically, problems are encountered with excessive weakening or failure of the heat seals about the periphery of the pouch. Also certain weaknesses or separations may develop between the layers in the multiple layer sheet structure.

In some sterile packaging applications, it is desirable to be able to visibly inspect the product. In these cases, a transparent packaging film is highly desirable, and foil based films are less desirable.

In other packaging applications, it is indeed important that metal foil be specifically excluded from the structure so that the completed package can be penetrated by microwave energy, such as for cooking food contained in the package.

Among these structures which have proven themselves capable of withstanding the sterilizing process, the sealant, or inner layer of the pouch is believed to be, in almost all cases, based on polypropylene, and in some cases, propylene copolymers. While pouches made with the propylene based polymers are functionally capable of surviving the sterilizing process, their sheet structure is relatively brittle and hard. Thus the pouches are somewhat susceptible to cracking and crazing if subjected to rough handling. There are also some limited problems with weakening of interlayer adhesion between the layers. Once the interlayer adhesion is weakened, the pouch is, of course, subject to further damage by limited abusive handling which an unweakened pouch could normally tolerate.

While pouches made with known sheet structures have achieved a limited degree of success, it is desirable to provide an improved sheet structure which is capable of surving intact the typical sterilizing processes. It is particularly desirable to have a sheet structure with an improved sealant layer structure. In some cases, it is desirable that the sheet structure be transparent. In still other cases it is specifically important that the sheet structure contain no significant metallic component.

Among the characteristics of improved sealant layer structure are that it should be less brittle than the propylene-based sealants. It should also survive the sterilizing process with good heat seal strength about the pouch periphery. Also the interlayer adhesion should remain strong enough that the several layers remain intact as a unit and mutually support each other under stress, particularly after the sterilization process.

SUMMARY OF THE INVENTION

It has now been found that certain of these and related objectives are met in a novel multiple layer flexible packaging film structure, herein disclosed. The layers are firmly adhered to each other in face to face contact. The structure includes, in order, a first layer of linear low density polyethylene, and a second layer of linear low density polyethylene. The second layer is optionally a blend of linear low density polyethylene and medium density polyethylene. A third layer is an anhydride modified medium density polyethylene. Fourth, fifth and sixth layers are respectively nylon, ethylene vinyl alcohol copolymer and nylon.

In one modification of the invention, an additional layer of linear low density polyethylene is positioned between the second and third layers.

In the preferred embodiment the second layer may be a blend of 0% to 80% medium density polyethylene and 20% to 100% linear low density polyethylene. In the hereinbefore iterated modified embodiment, the additional layer may contain 0% to 80% medium density polyethylene and 20% to 100% linear low density polyethylene.

In the preferred process of making the sheet structure, a subassembly is first made including all but the first and second layers, preferably by a coextrusion process. The first layer is then extrusion laminated to the remainder of the structure using the second layer as the extrusion laminant.

DETAILED DESCRIPTION OF THE INVENTION

Figure 1:
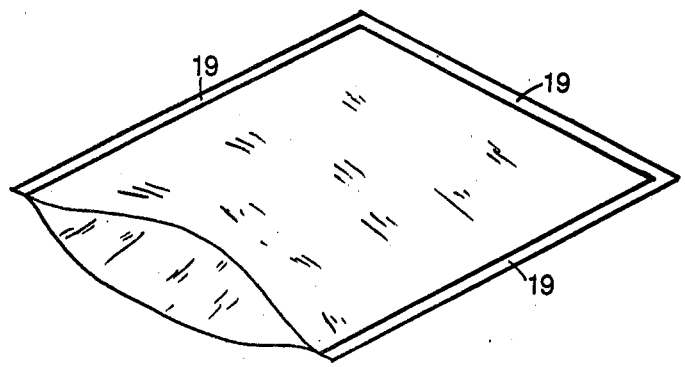
FIG. 1 shows a pouch, sealed on three sides and made with the sheet structure of this invention.
Figure 2:
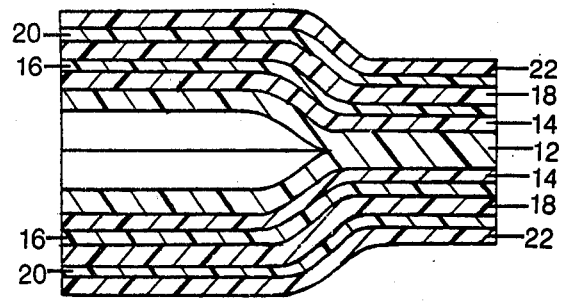
FIG. 2 shows a cross-section of the pouch of FIG. 1 taken at 2—2 of FIG. 1.
Figure 3:
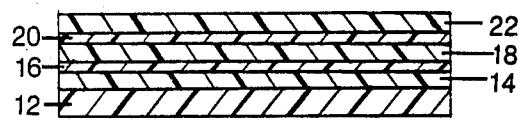
FIG. 3 shows a cross-section of sheet structure used to form the pouch shown in FIGS. 1 and 2.

The invention will now be described in detail and in relation to the drawings. FIG. 1 illustrates a pouch such as is the desired packaging structure of this invention. A cross-section of a portion of the pouch is shown in FIG. 2. The sheet material used to make the pouch is seen in FIG. 3. By comparison of FIGS. 2 and 3 it is seen that the FIG. 2 construction consists of two sheet elements of the FIG. 3 construction in face to face relation with the layers 12 joined at the one edge in a heat seal. The pouch is formed by arranging the two sheet elements in face to face relationship and forming heat seals 19 about the common periphery. Alternately, the pouch may be formed by folding a sheet element onto itself and forming heat seals about the edges. Either way the formed pouch appears as shown in FIG. 1.

Referring now to FIGS. 2 and 3, layer 12 is a heat sealable layer comprised of linear low density polyethylene. Layer 14 is an adhesive or tie, layer based on linear low density polyethylene. Layer 16 is also an adhesive, or tie, layer and is an anhydride modified medium density polyethylene. Layers 18 and 22 are nylon. Layer 20 is an ethylene vinyl alcohol copolymer. The formed pouch structure thus has an inner heat seal layer of linear low density polyethylene and an outer surface of nylon. The intermediate layers serve the functions of strengthening the structure, providing certain barrier properties, and bonding the structure together.

The formed pouch is intended for packaging products which are subjected to a sterilizing process after the product is in the package and the package is sealed. A common sterilizing process is known as autoclave, or retort, processing. In this process, closed and sealed packages are placed in a pressure vessel. Steam and water are then introduced into the vessel at about 275° F. at a sufficiently high pressure to permit maintenance of the desired temperature. The temperature and pressure are usually maintained for about 30 minutes. Finally, the pressure vessel is cooled and the pressure temporarily maintained until the packages cool internally. Finally the pressure is released and the processed packages are removed.

In the pouch structure, the heat seal layer 12 significantly influences the physical properties of the pouch because there is physically more material in layer 12 than in any other single layer. The composition of layer 12 may be any of the polymers or copolymers known as linear low density polyethylene. These polymers are relatively extensible and elastic in nature, giving the pouch a degree of resilience in absorbing physical abuse.

Layer 14 has a composition based on linear low density polyethylene, and may contain up to 80% medium density polyethylene. The medium density polyethylene may include anhydride modifiers such as maleic anhydride. The composition of layer 14 serves as a tie layer to bond layer 12 to the remainder of the structure.

Layer 16 is an anhydride modified medium density polyethylene. One such preferred material, which is modified with maleic anhydride, is available from Mitsui Company of Japan as Admer NF500.

The nylons in layers 18 and 22 usually are the same composition, although the user may satisfactorily choose to use different nylon polymers. Preferred nylon compositions are nylon 6 and blends of nylon 6 with nylon 12. In the blends, no more than 50% of the composition may be nylon 12, since concentrations over this amount yield pouches susceptible to failing abuse testing after retort processing.

Layers 18 and 22 provide, as their primary function, abuse resistance. Since nylon polymers can absorb a lot of abuse, they protect the more physically sensitive layers of the pouch structure. Layer 22 is specifically protective of the thin, brittle, and fragile layer 20 of ethylene vinyl alcohol. The combination of layers 18 and 22 serves to encapsulate layer 20 during the extrusion process, and thus provides a degree of thermal protection in that role.

Layer 20 of ethylene vinyl alcohol copolymer provides a barrier to passage of oxygen through the pouch structure. Any of the ethylene vinyl alcohols may be used, so long as at least 90% of the ester units have been hydrolyzed to the alcohol form. While some ethylene vinyl alcohol copolymers may provide an adequate barrier with less than 90% hydrolysis, this normally is not the case, and the composition of layer 20 must be chosen such that the needed barrier is provided. Because the vinyl alcohol is so brittle, it is sometimes desirable to incorporate plasticizing agents into layer 20. And such is entirely acceptable so long as an adequate oxygen barrier property is preserved.

Figure 4:
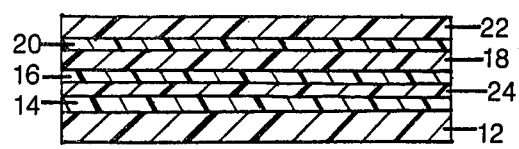
FIG. 4 shows a cross-section of an alternate sheet structure of the invention which may be used to make the pouch of FIG. 1.

FIG. 4 shows a cross-section of an alternate sheet structure of the invention. The FIG. 4 structure is the same as the FIG. 3 structure except that it incorporates one additional layer 24 of linear low density polyethylene between layers 14 and 16. Layer 24 may, optionally, be a blend composition of 0% to 80% medium density polyethylene and 20% to 100% linear low density polyethylene. In the FIG. 4 structure, the composition of layer 14 preferrably has a high proportion of linear low density polyethylene, generally greater than 50% by weight.

In a structure where both layers 14 and 24 are used, the compositions of the respective layers may, but normally will not, be the same. For example, it is convenient to first coextrude two structure subassemblies. The first subassembly includes layers 16, 18, 20, 22, and 24. The second subassembly is layer 12. The structure is then fully assembled by joining layers 12 and 24 in an extrusion lamination process using the layer 14 composition as the extrusion laminant. Thus the process requirements for layer 24, for coextrusion, may differ significantly from the process requirement for layer 14, for extrusion lamination. In accomodation of those process differences, different specific polymers may be selected. Clearly, in structures this complex, minor adjustments may be made without departing from the spirit of the invention.

Layers 12 and 24 are intentionally defined with a broad range of possible blend compositions such that the composition for each structure may be tailored for best performance in that particular structure. The first important parameter to be considered is that the two components, when blended, must form a compatible polymeric mixture, which they do. Secondly each of the components of the blend contributes to forming good bonding with the adjacent layer of like polymeric composition. Thus the medium density polyethylene component of the blend contributes the preponderance of the bond forming capability between layer 14 and layer 16 in the FIG. 3 structure. Similarly the linear low density polyethylene component of the blend contributes the preponderance of the bond forming capability between layer 14 and layer 12 which is composed of linear low density polyethylene.

In general terms, the preferred composition for layer 14 is 40% to 60% medium density polyethylene and 60% to 40% linear low density polyethylene. Indeed, a composition highly satisfactory for a variety of structures of this invention is 50% medium density polyethylene and 50% linear low density polyethylene.

Similar relationships are used in the FIG. 4 structure. Blends high in linear low density polyethylene are used for layer 14, while blends high in medium density polyethylene are used for layer 24; so that each of layers 14 and 24 may serve to bond to its adjacent layer, either 12 or 16. The blend composition of either layer may be adjusted for maximum benefit either by adjusting the blend ratio, by selecting an alternate polymer component of linear low density polyethylene, or medium density polyethylene, or by using both techniques. For example, using the general structure of FIG. 3, if the bond between layers 14 and 16 is weaker than desired, the compostion of layer 14 may be adjusted. One alternative is to increase the proportion of medium density polyethylene in the layer 14 composition. Another alternative is to choose an alternate specific polymer for use as the medium density polyethylene component of the blend.

The above techniques regarding adjusting the blend layer compositions are significant in enabling the best practice of the invention and in obtaining maximum benefit from the packages of the invention. These techniques are, however, only significant regarding maximizing the benefits to be gained from the invention, and are not critical to the basic practice of the invention, which can be satisfactorily practiced within a broad range of blend layer compositions.

Another primary element of concern is that the compositions of layers 14 and 24 be selected such that there is good compatibility physically and chemically between the compositions of the layers at their common interfaces; this to encourage intimate contact and bond development between the respective components of the layers.

Sheet structures of this invention generally range in thickness from about 5 mils up to about 15 mils. The thickest layer is usually the sealant layer and the thinnest layers usually are the tie layers and the ethylene vinyl alcohol layer.

The sheet structures of this invention may be made by conventional processes and combinations of processes. The process and its sequences may be selected according to the equipment and polymers available. The specific structure selected and the compositions of layer 14, and optional layer 24, will be at least partially dependent on the process and its sequences.

Using FIG. 3 as an example structure, layers 16, 18, 20 and 22 are coextruded as a four-layer film. The structure is completed by extrusion coating or coextrusion coating layers 14 and 12 onto layer 16.

Use of this process imposes certain limitations on the composition of layer 14. While it must bond to layer 16 in the finished structure, a primary concern imposed by the process is that the compositions of layers 12 and, particularly, 14 must be coselected so that the processing temperatures and melt flow properties are compatible to extrusion coating, coextrusion, and coextrusion coating, as the specific process may require. Particularly regarding layer 14, certain compromises, such as bond strength between layers 14 and 16, may have to be made in its composition, albeit within the ranges of the invention, in order to accomodate the coextrusion and extrusion coating processes.

In another process for making the FIG. 3 structure, layer 12 is extruded as a separate film. Layer 12 and the combination of layers 16, 18, 20 and 22 are simultaneously pulled through a nip and layer 14 is extruded into the nip between layers 12 and 16 in an extrusion lamination process.

In still another process for making the structure of FIG. 3, layers 12 and 14 are coextruded and the combinations of layers 12 and 14, and 16, 18, 20, and 22 are pulled through a hot nip from opposite sides, and a combination of heat and pressure are applied to effect the formation of the bond between layers 14 and 16.

Now that these several exemplary processes for making the structure of FIG. 3 have been described, those skilled in the art will appreciate that the structure illustrated in FIG. 4 may likewise be made by similar processes and combinations of processes.

Having thus described the invention, what is claimed is:

1. A laminated multiple layer flexible packaging structure, wherein the layers are firmly adhered to each other in face to face contact, the structure comprising, in order:
   (a) a first layer of linear low density polyethylene;
   (b) a second layer of linear low density polyethylene;
   (c) a third layer of anhydride modified medium density polyethylene; and
   (d) fourth, fifth and sixth layers respectively of nylon, ethylene vinyl alcohol, and nylon.

2. A laminated structure as in claim 1 and including an additional layer of linear low density polyethylene juxtaposed between said second and third layers.

3. A laminated structure as in claim 1 wherein said second layer comprises, in blend composition, 0% to 80% medium density polyethylene and 20% to 100% linear low density polyethylene.

4. A laminated structure as in claim 2 wherein said additional layer contains, in blend composition, 0% to 80% medium density polyethylene and 20% to 100% linear low density polyethylene.

5. A laminated structure as in claim 1, 2, 3 or 4 made by the process of extrusion laminating said first layer to the remainder of said structure using said second layer as the extrusion laminant.

6. A pouch made from the packaging structure of claim 1, 2, 3, or 4.

* * * * *